Aug. 15, 1950     D. B. HYDE     2,518,549
BIRD CAKE HOLDER
Filed March 14, 1947
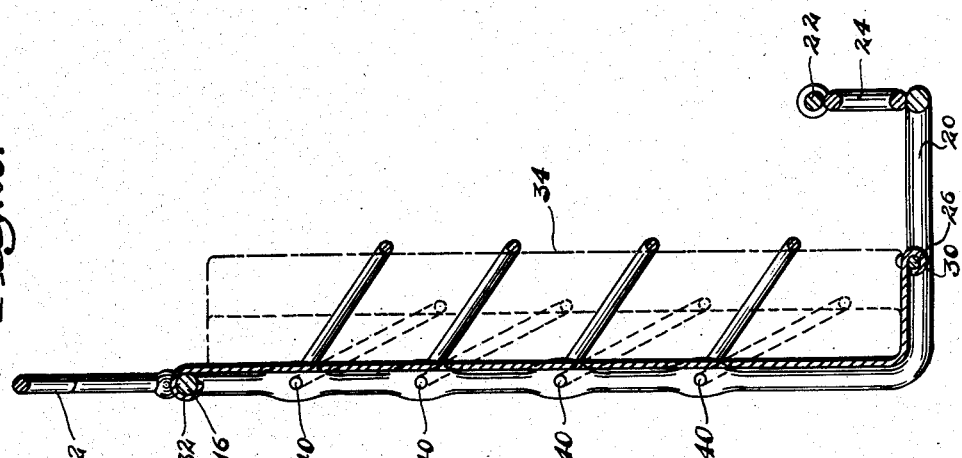
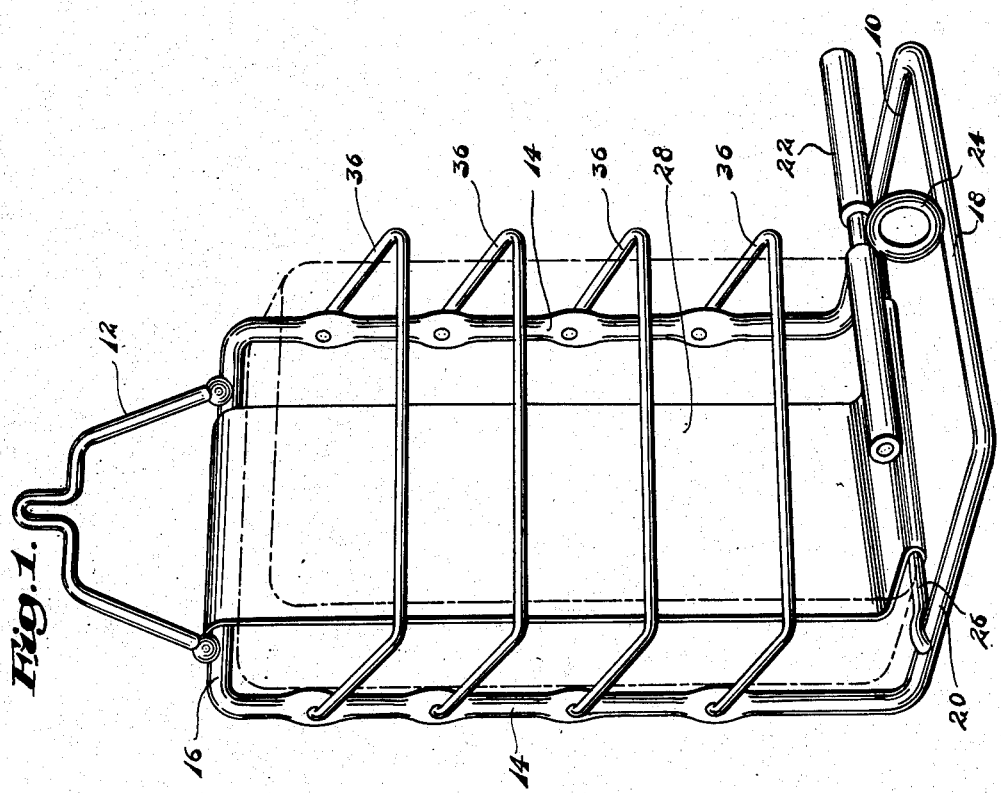
Inventor:
Donald B. Hyde,
by Thomson & Thomson
Attorneys Patented Aug. 15, 1950

2,518,549

UNITED STATES PATENT OFFICE 2,518,549

BIRD CAKE HOLDER

Donald B. Hyde, Newton, Mass.

Application March 14, 1947, Serial No. 734,643

3 Claims. (Cl. 119—60)

This invention relates to improvements in a bird cake holder.

It is a customary practice to prepare bird food in the form of cakes which are held in suitable holders either alone or in association with other bird feeding equipment or with a bird house. The bird cake must be held in such manner that birds may peck the food from between the bars of the cake holder. If the bars are fixed in position, the birds may be caught between the bars as they peck at the cake, particularly after it has been partially consumed.

It is the object of my invention to provide a bird cake holder in which certain of the bars, for holding the cake automatically, adjust as the food is eaten.

One embodiment of my invention is illustrated in the accompanying drawing; in which:

Fig. 1 is a perspective view of the bird cake holder showing the bird cake in dotted lines;

Fig. 2 is a vertical section taken through the bird cake holder and showing in dotted lines the manner in which the bars adjust as the cake is consumed.

In the form illustrated, the cake holder comprises a heavy wire frame 10 adapted to be suspended by the hanger 12. The frame comprises the upright side bars 14, connected at the top by the bar 16 and at the bottom by the cross-bar portion 18; the bottom portions of the side bars 14 are bent horizontally in respect to the vertical portion of the side bars to form a base composed of the side portions 20 and the front bar 18.

A bird rest 22 may be mounted through the ring 24 on the bar 18. The side bars 20 of the base are connected by the cross member 26 to which is connected the lower end of a metal strap 28 which forms the back of the cake holder. The lower end of the strap 28 is wrapped around the cross-member 26, as shown at 30, while the upper end of the strap 28 is bent around the cross-bar 16, as shown at 32. The bird cake is indicated by the dotted lines 34.

As shown, the cake rests against the strap 28. In order to further hold the cake in place, a plurality of front bars 36 are employed. The ends of each of the bars 36 are pivotally mounted in the side bars 14 as shown by the pivotal connections 40, thus the bars 36 are free to swing downwardly as the cake is used up and rest against the surface of the cake.

It will be appreciated that if the bars 36 were fixed in position, the bird would have to thrust his neck between the bars to reach the food, after it has been partially consumed, and thus the bird might be caught between the bars. By making the bars movable, as shown, this danger is avoided.

I claim:

1. A bird cake holder comprising a back and a floor adapted to support a bird cake in a vertical position, and freely movable means carried by said back to hold said bird cake against the back as it is consumed.

2. A bird cake holder comprising a back and a floor adapted to support a bird cake in a vertical position and freely movable means carried by said back to hold said bird cake against said back as it is consumed, said means comprising a plurality of U-shaped rods extending across the sides and front of said bird cake, said rods being freely swingable downwardly to hold the bird cake as it is consumed.

3. A bird cake holder comprising a vertical back, a horizontal floor forwardly extending from said back, said back and floor being adapted to support a bird cake in a vertical position resting on said floor and against said back, a plurality of U-shaped front bars pivotally supported at their ends by said back, said bars extending across the vertical sides and front of said bird cake, each of said bars being freely swingable downwardly to hold the bird cake in position against said back as it is consumed, and a bird rest fixed to the front of said floor and extending upwardly in front of the bird cake.

DONALD B. HYDE.

REFERENCES CITED

The following references are of record in the file of this patent:

UNITED STATES PATENTS

| Number | Name | Date |
|---|---|---|
| D. 146,408 | Hyde | Feb. 25, 1947 |
| 529,230 | Zimmerman | Nov. 13, 1894 |
| 2,066,823 | Cohen | Jan. 5, 1937 |

FOREIGN PATENTS

| Number | Country | Date |
|---|---|---|
| 155,083 | Great Britain | Dec. 16, 1920 |
| 88,138 | Switzerland | June 16, 1921 |